(12) United States Patent
Fusegi et al.

(10) Patent No.: US 9,005,069 B2
(45) Date of Patent: Apr. 14, 2015

(54) POWER INTERRUPTING APPARATUS AND POWER TRANSMITTING APPARATUS

(75) Inventors: Masaaki Fusegi, Tochigi (JP); Hiroyasu Furukawa, Tochigi (JP)

(73) Assignee: GKN Driveline Japan Ltd., Tochigi (JP)

( * ) Notice: Subject to any disclaimer, the term of this patent is extended or adjusted under 35 U.S.C. 154(b) by 536 days.

(21) Appl. No.: 13/420,942

(22) Filed: Mar. 15, 2012

(65) Prior Publication Data

US 2012/0238388 A1 Sep. 20, 2012

(30) Foreign Application Priority Data

Mar. 15, 2011 (JP) ................................ 2011-057043

(51) Int. Cl.
*F16D 27/118* (2006.01)
*F16H 48/30* (2012.01)
*B60K 17/00* (2006.01)
*F16D 28/00* (2006.01)
*B60K 17/35* (2006.01)
*F16D 27/14* (2006.01)

(52) U.S. Cl.
CPC .............. *F16D 27/118* (2013.01); *F16H 48/30* (2013.01); *F16D 28/00* (2013.01); *B60K 17/3515* (2013.01); *F16D 27/14* (2013.01)

(58) Field of Classification Search
CPC ....... F16D 27/118; F16D 11/14; F16D 28/00; B60K 17/3515; F16H 48/30
USPC .................................. 475/221, 222, 223, 231
See application file for complete search history.

(56) References Cited

U.S. PATENT DOCUMENTS

| 4,341,281 | A | 7/1982 | Nagy |
| 5,041,069 | A * | 8/1991 | Horst ............................ 475/231 |
| 7,399,248 | B2 | 7/2008 | Kleinhans et al. |
| 2008/0210508 | A1* | 9/2008 | Heisey et al. ................... 192/44 |

* cited by examiner

*Primary Examiner* — Edwin A Young
*Assistant Examiner* — Colby M Hansen
(74) *Attorney, Agent, or Firm* — Osha Liang LLP

(57) ABSTRACT

A power interrupting apparatus is provided with: a first rotating member, a second rotating member, a clutch device adapted to interrupt a coupling between the first rotating member and the second rotating member, and an actuator adapted to actuate the clutch device. The actuator is disposed on a radially outer periphery of a part of one of the first rotating member and the second rotating member.

10 Claims, 9 Drawing Sheets

POWER INTERRUPTING APPARATUS AND POWER TRANSMITTING APPARATUS

CROSS-REFERENCE TO RELATED APPLICATIONS

The present application claims priority to Japanese Patent Application No. 2011-057043, filed in the Japan Patent Office on Mar. 15, 2011, the disclosure of which is herein incorporated by reference in its entirety.

BACKGROUND OF THE INVENTION

1. Field of the Invention

The present invention relates to a power interrupting apparatus and a power transmitting apparatus.

2. Related Art

U.S. Pat. No. 4,341,281 discloses a split axle drive mechanism. In this split axle drive mechanism, a clutch is provided between a stub shaft protruding out of a differential gear case of a front differential device and an extension shaft extending toward the axle.

An actuator for actuating the clutch is provided outside of a carrier for rotatably supporting the differential gear case and is configured to operate the clutch via a rod and a fork. Accordingly, a clutch ring is moved by an actuation of the actuator to cause the clutch to be connected. Thereby, a power transmission between the stub shaft and the extension shaft is carried out and therefore a four-wheeled driving (4WD) can be allowed.

When the actuator stops operating, the clutch is cut-off by a return movement of the clutch ring and therefore a two-wheeled driving (2WD) can be allowed.

However, since the actuator is provided outside of the carrier, the carrier is designed for a dedicated application. Accordingly, there is a problem that a compatibility with a standardized product which has no clutch is hindered.

In addition, since the actuator is provided outside of the carrier, a collision with an obstacle may be occurred and thus reliability is decreased. Moreover, an occupying space of the actuator outside of the carrier is also increased.

SUMMARY OF THE INVENTION

One ore more embodiments provide a power interrupting apparatus and a power transmitting apparatus in which a modification of a carrier is suppressed, a compatibility with a standardized product which has no clutch device and actuator is improved, a risk of colliding with an obstacle is suppressed to improve a reliability, and it is also possible to reduce an occupying space thereof.

DETAILED DESCRIPTION OF THE EMBODIMENTS

Hereinafter, embodiments and modifications thereof will be described with reference to the drawings. The embodiments and the modifications described herein are not intended to limit the invention but only to exemplify the invention, and all features or combinations of the features of the embodiments and the modifications are not always essential to the invention.

Embodiment 1

Figure 1:
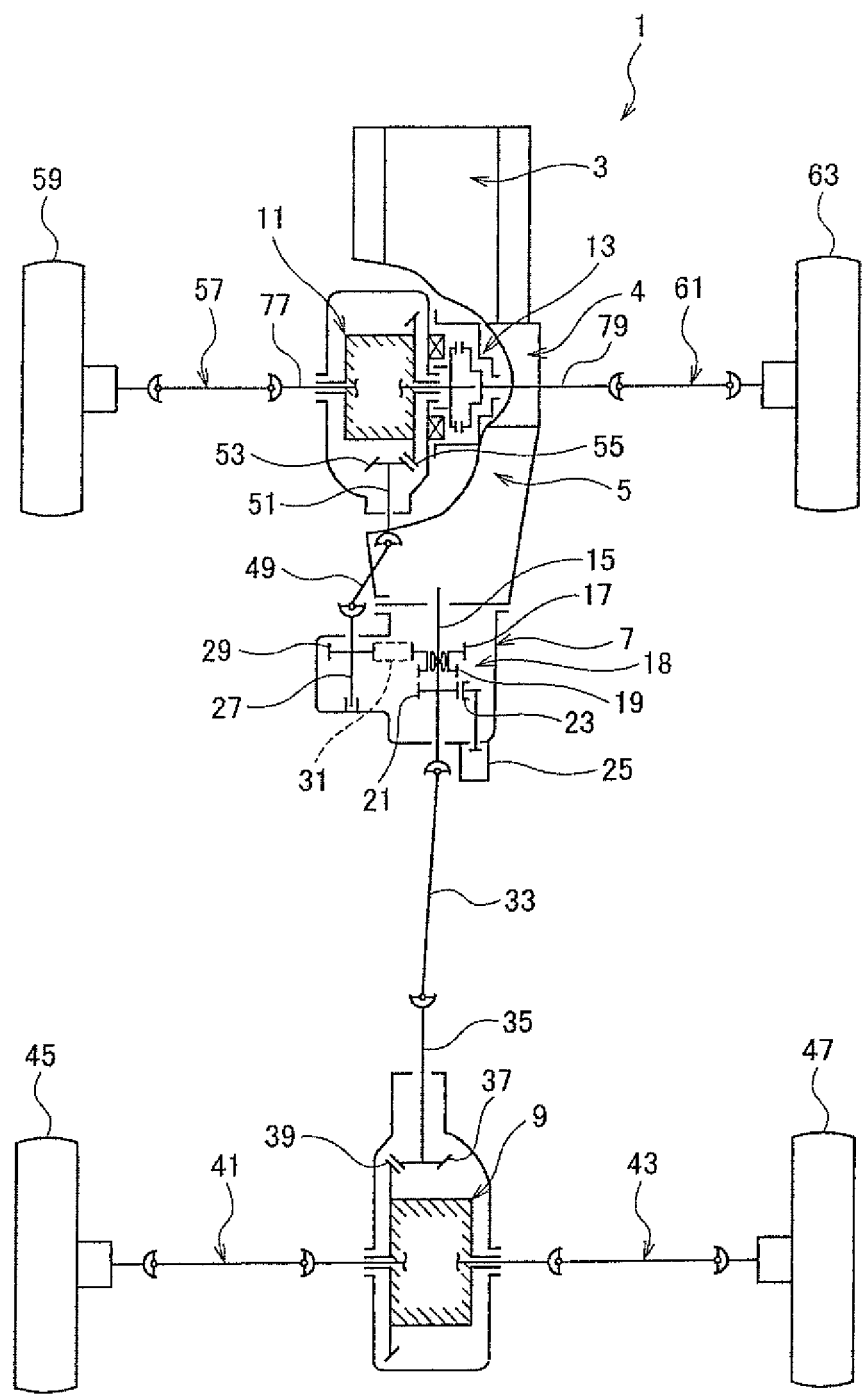
FIG. 1 is a skeleton plan view of a vehicle. (Embodiment 1)

FIG. 1 illustrates an arrangement of a power interrupting apparatus according to an Embodiment 1 and is a skeleton plan view of a four-wheel drive wheel of a front engine rear drive base (FR base) arranged in a longitudinal direction.

As illustrated in FIG. 1, the four-wheel drive vehicle 1 includes an engine 3, a motor generator 4, a transmission 5, a transfer 7, a rear differential device 9, a front differential device 11, and an axle disconnect device 13 as a power interrupting apparatus.

The transfer 7 includes an output drive shaft 15 coupled to the output side part of the transmission 5 and a sprocket 17 rotatably supported on the output drive shaft 15. A front-side interrupting mechanism 18 is provided between the sprocket 17 and the output drive shaft 15.

That is, the sprocket 17 is integrally provided with a clutch gear 19. A clutch gear 21 is fixed to the output drive shaft 15. Coupling between the clutch gears 19, 21 is interrupted by movement of a coupling sleeve 23. The coupling sleeve 23 is configured to be driven by an electromagnetic actuator 25 such as a solenoid.

A transmission shaft 27 is supported on the transfer 7 to be parallel to the output drive shaft 15 and a sprocket 29 is fixed to the transmission shaft 27. A chain 31 spans between the sprocket 29 and the sprocket 17.

The output drive shaft 15 of the transfer 7 is coupled to a drive pinion shaft 35 via a propeller shaft 33 and a drive pinion gear 37 of the drive pinion shaft 35 is engaged with a ring gear 39 of the rear differential device 9.

Rear wheels 45, 47 are in interlocking connection with the rear differential device 9 via left and right axles 41, 43.

The transmission shaft 27 of the transfer 7 is coupled to the drive pinion shaft 51 side via a propeller shaft 49. A pinion gear 53 of the drive pinion shaft 51 is engaged with a ring gear 55 of the front differential device 11.

One side of the front differential device 11 is in interlocking connection with a front wheel 59 via an axle 57 and the other side thereof is in interlocking connection with a front wheel 63 via an axle 61. The axle disconnect device 13 is provided between the front differential device 11 and the axle 61. Disconnection and connection of the axle 61 can be carried out by the axle disconnect device 13.

Accordingly, on the one hand, the output (torque) of the engine 3 or the output (torque) of the engine 3 and the motor generator 4 is transmitted from the transmission 5 via the output drive shaft 15 in a direct connection state. That is, the output can be transmitted to the rear differential device 9 via the output drive shaft 15, the propeller shaft 33, the drive pinion shaft 35, the drive pinion gear 37 and the ring gear 39.

A power of the rear differential device 9 can be outputted to the left and right rear wheels 45, 47 via the left and right axles 41, 43.

Further, on the other hand, when the clutch gears 19, 21 are coupled to each other by the coupling sleeve 23 and the axle disconnect device 13 is connected to the axle 57, the torque is transmitted from the output drive shaft 15 to the front differential device 11 via the sprocket 17, the chain 31, the sprocket 29, the transmission shaft 27, the propeller shaft 49, the drive pinion shaft 51, the drive pinion gear 53 and the ring gear 55.

A power of the front differential device 11 can be outputted to the left and right front wheels 59, 63 via the left and right axles 57, 61.

When the axle 57 is disconnected by the axle disconnect device 13, the torque is not transmitted from the front differential device 11 to the left and right front wheels 59, 63.

At this time, when an electromagnetic actuator 25 is driven to move the coupling sleeve 23 and thus the coupling between the clutch gears 19, 21 is cut-off, the parts between the transfer 7 and the front differential device 11 stops rotating. That is, the sprocket 17, the chain 31, the sprocket 29, the transmission shaft 27, the propeller shaft 49, the drive pinion shaft 51, the drive pinion gear 53 and the ring gear 55 stops rotating. Accordingly, it is possible to avoid unnecessary driving.

Accordingly, it is possible to selectively switch between the two-wheel drive (2WD) and the four-wheel drive (4WD) by the interruption control of the axle disconnect device 13.

Figure 2:
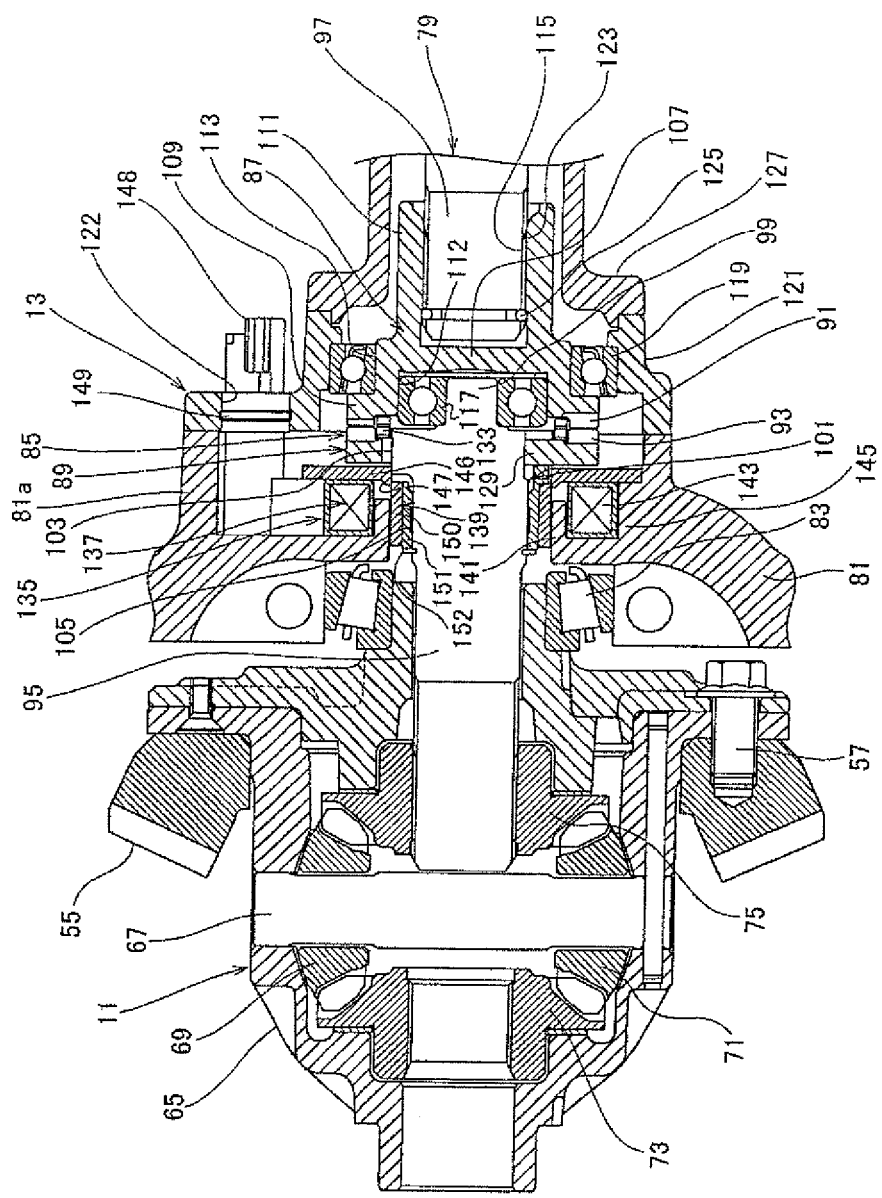
FIG. 2 is an enlarged sectional view illustrating surroundings of a front differential device. (Embodiment 1)

FIG. 2 is an enlarged sectional view illustrating surroundings of a front differential device.

As illustrated in FIG. 2, in the front differential device 11, the ring gear 55 is fixed to outside of the differential case 65 by a bolt 57 and pinion gears 69, 71 are rotatably supported inside of the differential case 65 via the pinion shaft 67. Left and right side gear 73, 75 are engaged with the pinion gears 69, 71 and intermediate shafts 77, 79 for power transmission on the axles 57, 61 side are spline-fitted into both side gears 73, 75.

The differential case 65 is rotatably supported on a carrier 81 by bearings 83 (only one thereof is illustrated in FIG. 2). The carrier 81 is formed with an actuator accommodating part 81a.

The axle disconnect device 13 is provided in one intermediate shaft 79 and includes a cylindrical clutch body 87 and a clutch ring 89. The cylindrical clutch body 87 is considered as a pair of rotating body of a torque interrupting clutch 85 and the clutch ring is considered as a moveable body. The torque interrupting clutch 85 constitutes a clutch device for interrupting a coupling by movement of the clutch ring 89 as a moveable body.

Protruding teeth 91, 93 are provided on opposing surfaces of the cylindrical clutch body 87 and the clutch ring 89 at predetermined intervals in a circumferential direction. As the cylindrical clutch body 87 and the clutch ring 89 rotate relative to each other in a rotation axis direction, the protruding teeth 91, 93 are engaged or disengaged from each other. In this way, rotating movement between the cylindrical clutch body 87 and the clutch ring 89 is stopped.

Furthermore, the intermediate shaft 79 is divided into the first and second shafts 95, 97. The clutch ring 89 is coupled to the first shaft 95 and the cylindrical clutch body 87 is coupled to the second shaft 97. The first shaft 95 constitutes a rotating shaft of a power interrupting apparatus protruding from the differential case 65 and the second shaft 97 constitutes a rotating member adjacent to a support part (will be described later) of the first shaft 95 as a rotating shaft.

Interlocking shaft part 99 having a thin diameter projects from an end surface of the first shaft 95 protruding from the differential case 65 and a support part 101 is integrally provided on an outer periphery end thereof. The support part 101 is directed toward the actuator accommodating part 81a of the carrier 81.

The support part 101 is formed with a sliding contact part 103 for the clutch ring 89. A plurality of the sliding contact parts 103 are arranged at predetermined intervals in a circumferential direction. An actuator fitting portion 105 is formed adjacent to the sliding contact part 103.

Figure 3:
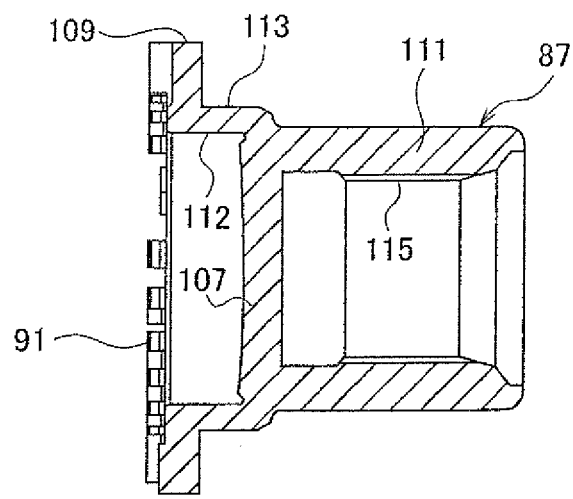
FIG. 3 is a sectional view of a cylindrical clutch body. (Embodiment 1)

FIG. 3 is a sectional view of a cylindrical clutch body.

As illustrated in FIGS. 2 and 3, the cylindrical clutch body 87 includes a flange part 109 on one side of an intermediate wall 107 and a cylindrical part 111 on the other side of the intermediate wall 107. The flange part 109 constitutes an opposing part which opposes to the moveable body in an axial direction. The protruding teeth 91 are formed on an opposing surface of the flange part 109. Bearing fitted parts 112, 113 are formed on an inner periphery side of the flange part 109 and an adjacent outer periphery of the flange part 109. Inner spline 115 is formed on an inner periphery of the cylindrical part 111.

The cylindrical clutch body 87 supports the first shaft 95 by a bearing 117 which is fitted into the bearing fitted part 112 on an inner periphery side thereof. The cylindrical clutch body 87 is rotatably supported on a housing 121 by a bearing 119 fitted into the bearing fitted part 113 on an outer periphery side thereof. The housing 121 is attached to the actuator accommodating part 81a of the differential carrier 81. The housing 121 is formed with a penetrating portion 122 for wiring.

In the cylindrical part 111 of the cylindrical clutch body 87, a spline 123 of the second shaft 97 is spline-engaged with the inner spline 115 and is prevented from being removed by a stop ring 125. Surroundings of a coupling part of the cylindrical part 111 of the cylindrical clutch body 87 and the second shaft 95 are covered with a cover 127. The cover 127 is coupled to the housing 121.

Figure 4:
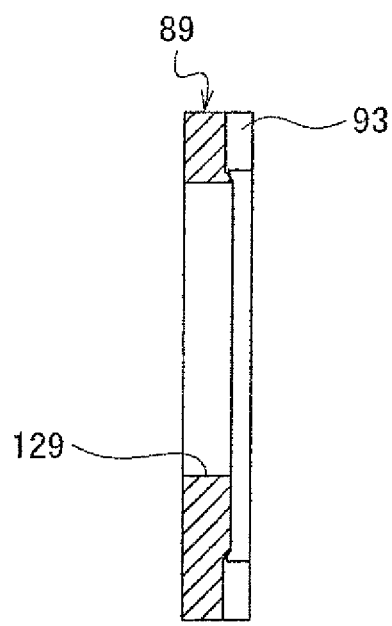
FIG. 4 is a sectional view of a clutch ring. (Embodiment 1)

FIG. 4 is a sectional view of a clutch ring.

As illustrated in FIGS. 2 and 4, the clutch ring 89 is formed at its opposing surface with the protruding teeth 93. A slide engaging part 129 extends from an inner periphery of the clutch ring.

The slide engaging part 129 is engaged with the sliding contact part 103 of the first shaft 95 and axially moves relative to the cylindrical clutch body 87.

A wave spring 133 is provided between the cylindrical clutch body 87 and the clutch ring 89 to urge the clutch ring 89 in a disengaging direction.

As illustrated in FIG. 2, a solenoid actuator 135 as an actuator for interrupting and moving the clutch ring 89 is supported around an outer periphery of the support part 101 of the first shaft 95. The solenoid actuator is accommodated in the actuator accommodating part 81a of the carrier 81.

The solenoid actuator 135 includes a solenoid 137 and a plunger 139 and forcibly moves the clutch ring 89 in an axial direction.

The solenoid 137 is configured to generate an electromagnetic force in accordance with an electric current control and includes a yoke 141 and a coil 143. The yoke 141 is integrally formed on a solenoid fixing part 145 of the carrier 81. The coil 143 is fixedly supported on the yoke 141.

The yoke 141 is a fixed core which is formed in an annular shape around a shaft center of the support part 101 and arranged concentric with the support part 101. The yoke and the carrier are formed by a magnetic body. A suction wall 146 is integrally coupled to the yoke 141 to constitute the fixed core. The suction wall 146 is formed with a suction part 147 made of a magnetic material.

The solenoid 137 is connected from a connector 148 to a controller side via a harness. The connector 148 extends outside of the housing 121 from the penetrating portion 122 of the housing 121 via a grommet 149.

The plunger 139 is formed as an actuating part for interrupting and moving the clutch ring 89 and has an annular shape. And, the plunger 139 is a moveable core which is arranged in an inner periphery side of the yoke 141 and supported on the clutch ring 89 to move in an axial direction. The plunger 139 includes a magnetic force acting part 150 made of a magnetic material and an interlocking part 151 made of a non-magnetic material. The interlocking part 151 may be integrally coupled to the magnetic force acting part 150 by welding or press-fitting or may be integrally formed with the magnetic force acting part 150.

The interlocking part 151 is fitted into an outer periphery of the actuator fitting portion 105 of the support part 101. Accordingly, the plunger 139 which is an actuating part of the actuator is directly supported on an outer periphery of the support part 101.

Leading end of the interlocking part 151 on the clutch ring 89 side is formed in an irregular comb teeth shape. The leading end of the interlocking part 151 abuts with the slide engaging part 129 of the clutch ring 89 between the sliding contact part 103 of the support part 101 in a circumferential direction to urge the clutch ring 89. Movement of the clutch ring 89 in a direction opposite to an urging direction thereof is restricted by a stopper ring 152. A smoothly inclined taper part opposing to the suction part 147 is formed on an outer peripheral end of the magnetic force acting part 150.

Accordingly, when the solenoid 137 is energized, magnetic flux is generated on the yoke 141, the suction wall 147 and the magnetic force acting part 150 of the plunger 139.

By such a formation of the magnetic flux, the magnetic force acting part 150 is suctioned by the suction part 147 and the plunger 139 moves axially.

By such a movement of the plunger 139, the interlocking part 150 is caused to forcibly move the clutch ring 89. By forcibly moving the clutch ring, the clutch ring 89 is moved against an urging force of the wave spring 133.

By movement of the clutch ring 89, the protruding teeth 91, 93 of the torque interrupting clutch 85 are engaged with each other and thus the first shaft 95 and the second shaft 97 are coupled to each other to rotate integrally. A power which is distributed and outputted from the front differential 11 toward the first shaft 91 is transmitted to the second shaft 97 by such a coupling.

By transmitting a power in such a way, a power is distributed and outputted toward the front wheels 59, 63 by the front differential 11, as mentioned above. Accordingly, 4WD travel becomes possible.

When the energization of the solenoid 137 is released, the suction part 147 stops suctioning the magnetic force acting part 150 and the clutch ring 89 is urged to its original position by an urging force of the wave spring 133. Accordingly, the torque interrupting clutch 85 is disengaged.

As the torque interrupting clutch is disengaged, the first shaft 95 and the second shaft 97 are disengaged from each other and thus a power transmission from the front differential 11 to the front wheels 59, 63 is not performed. Accordingly, 2WD travel becomes possible, as mentioned above.

Figure 5:
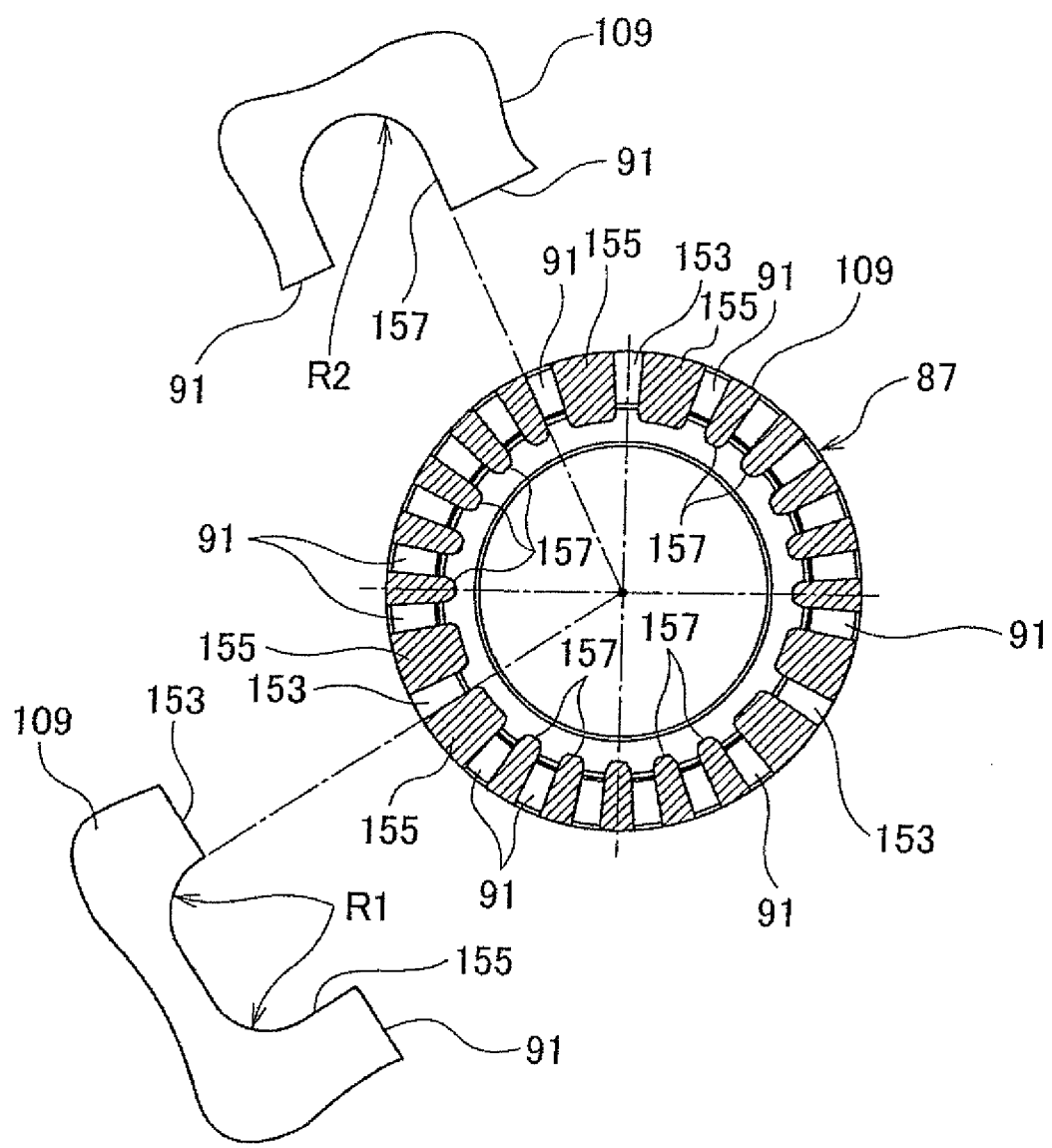
FIG. 5 is a front view illustrating protruding teeth of the cylindrical clutch body together with teeth grooves. (Embodiment 1)
Figure 6:
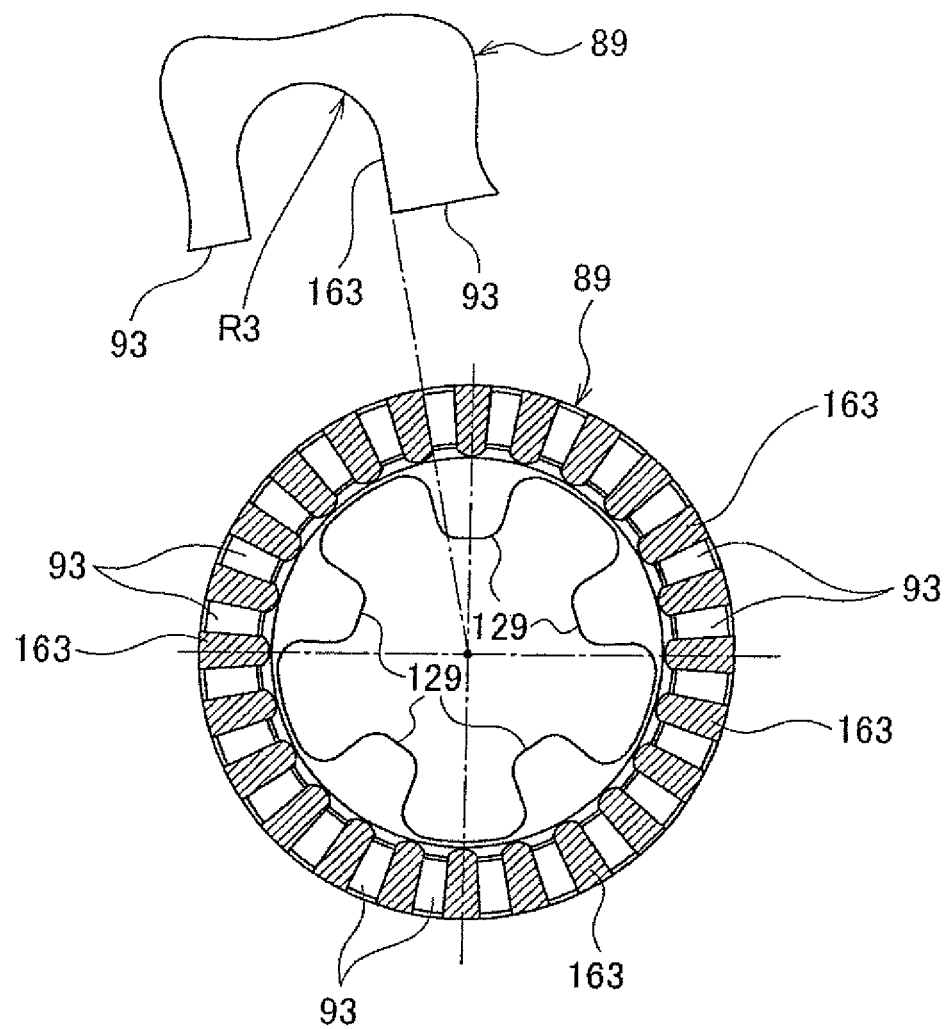
FIG. 6 is a front view illustrating protruding teeth of the clutch ring together with teeth grooves. (Embodiment 1)
Figure 7:
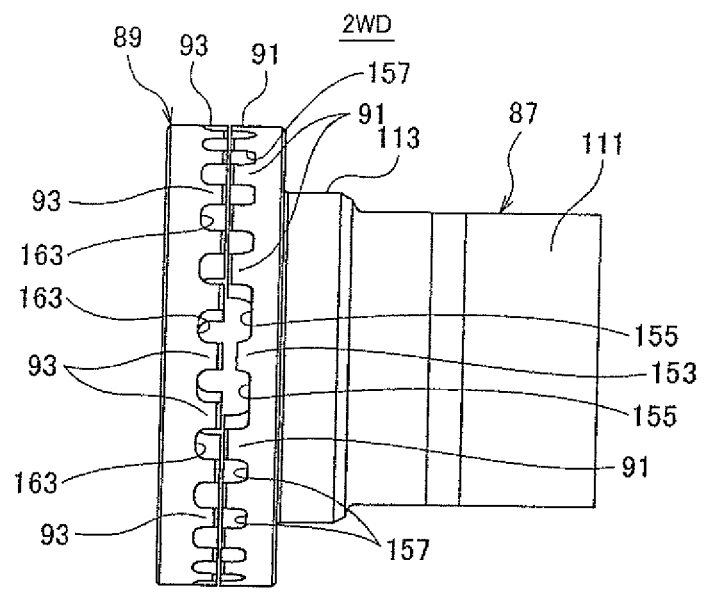
FIG. 7 is a side view illustrating disengagement/engagement of the cylindrical clutch body and the clutch ring. (Embodiment 1)
Figure 7:
Figure 7:
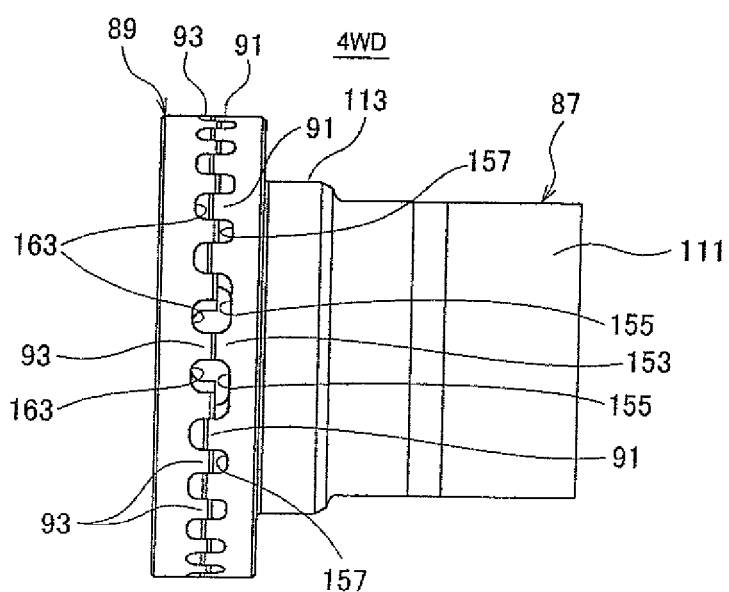

FIG. 5 is a front view illustrating protruding teeth of the cylindrical clutch body together with teeth grooves. FIG. 6 is a front view illustrating protruding teeth of the clutch ring together with teeth grooves. FIG. 7 is a side view illustrating disengagement and engagement of the cylindrical clutch body and the clutch ring.

As illustrated in FIGS. 5 and 7, an abutting part 153 having a projection shape is formed on the cylindrical clutch body 87 as one of rotating bodies. The abutting part 153 has a protruding height in a rotating axis direction which is lower than other protruding teeth 91. Further, the abutting part 153 is located at a position in which the phase thereof in a rotation direction is shifted from the protruding teeth 91.

That is, two adjacent protruding teeth are cut away and a central part of the teeth grooves remaining between two adjacent protruding teeth after such a cutting is formed as the abutting part 153. The number of the protruding teeth being cut away is at least two and it is also possible to form the abutting part 153 by increasing the number of the protruding teeth being cut away.

Therefore, a gap 155 between the abutting part 153 and both protruding teeth 91 is set wider than the teeth grooves 157. The bottom side of the gap 155 is formed with a natural curve R1 and the teeth grooves 157 are formed with a natural curve R2.

The abutting parts 153 are provided at regular intervals in three locations in the circumferential direction thereof. The abutting part 153 may be formed on at least three locations and the number of formation location thereof may be increased depending upon a transmission torque. Further, the abutting part 153 may be formed on the clutch ring 89 side.

The leading ends of the protruding teeth 91 and the abutting part 153 are formed flat.

As illustrated in FIGS. 6 and 7, the protruding teeth 93 of the clutch ring 89 are formed at regular intervals to engage with corresponding protruding teeth 91. The teeth groove 163 is formed with a natural curve R3.

Further, a leading end of the protruding teeth 93 is also formed flat.

Since it is desired that the abutting part 153 is located at a position in which the phase thereof in a rotation direction is shifted from the protruding teeth 91, the abutting part may be formed as an entire surface between the protruding teeth 91, instead of being formed as a protruding shape.

Further, the abutting part 153 may be formed as a relatively shallow teeth bottom which is obtained by deeply forming a teeth bottom of another teeth groove, except for some of the teeth grooves of same rotating body in a conventional dog clutch, in a state where the phase thereof is not shifted.

And, as illustrated in the lower part of FIG. 7 (4WD state), in a state where the protruding teeth 91, 93 of the cylindrical clutch body 87 and the clutch ring 89 are engaged with each other, the abutting part 153 of the cylindrical clutch body 87 abuts with any one tip of the protruding teeth 93 of the clutch ring 89 and the cylindrical clutch body 87 and the clutch ring 89 are abutted with each other in a rotation axis direction.

At this time, the protruding teeth 91, 93 are engaged at their sides with each other in the direction of rotation.

Accordingly, as the electromagnet 129 is energized, the clutch ring 89 moves as mentioned above and engages with the cylindrical clutch body 87, as illustrated in the lower part of FIG. 7. On the contrary, as the energization of the electromagnet 129 is released, the clutch ring 89 returns to its original position by an urging force of the wave spring 133 and is disengaged, as illustrated in the upper part of FIG. 7 (2WD state).

Even when the clutch ring 89 rotates relative to the cylindrical clutch body 87 while being engaged therewith, the protruding teeth 91, 93 of the cylindrical clutch body 87 and the clutch ring 89 have uniform teeth length and the length of abutting part 153 is lower than the teeth length of the protruding teeth 91. Accordingly, it is possible to prevent the abutting part 153 from being disengaged.

Further, since the protruding teeth 93 having uniform teeth length are formed at regular intervals on the clutch ring 89, any one of the protruding teeth 93 can abut with the abutting part 153 at any engaging location for the cylindrical clutch body 87.

Figure 8:
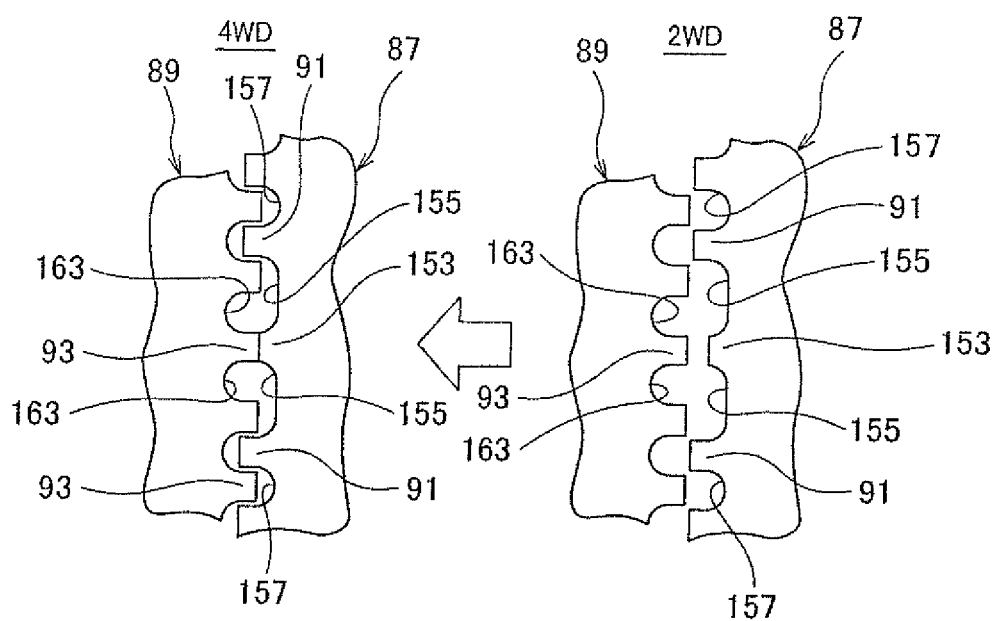
FIG. 8 is a side view of a main part illustrating disengagement/engagement of the cylindrical clutch body and the clutch ring. (Embodiment 1)

FIG. 8 is a side view of a main part illustrating disengagement/engagement of the cylindrical clutch body and the clutch ring.

Referring to FIG. 8 in the embodiment of the present invention, if switching from 2WD to 4WD is carried out, the abutting part 153 is abutted with one of the protruding teeth 93 and thus engagement between both protruding teeth 91, 93 is carried out.

Accordingly, abutting locations between the cylindrical clutch body 87 and the clutch ring 89 can be reduced and thus locations required for dimensional accuracy can be also reduced.

Further, engagement height of the protruding teeth 91, 93 in a longitudinal direction thereof is adjusted and a gap with natural curves R3, R2 is formed between the protruding teeth 91, 93 and the teeth grooves 163, 157. Therefore, lubricant can be easily removed from the teeth grooves 163, 157. Further, viscous resistance due to the lubricant is hardly existed between a tip of the protruding teeth and a bottom of the teeth grooves during engagement and disengagement thereof.

According to the Embodiment, the axle disconnect device 13 includes a first shaft 95 for power transmission in the differential case 65 which is rotatably supported on the carrier 81. Herein, the support part 101 is extended on an end of the first shaft 95 protruding from the differential case 65. The clutch ring 89 for interruption is supported on the support part 101 and a flange part 109 axially opposing to the clutch ring 89 is provided on the second shaft 97 adjacent to the support part 101. And, the torque interrupting clutch 85 is provided between the clutch ring 89 and the flange part 109 and interrupts a coupling therewith by the movement of the clutch ring 89. The solenoid actuator 135 for interrupting and moving the clutch ring 89 is arranged on an outer periphery of the support part 101.

Therefore, it is possible to improve compatibility with a standardized product which has no the solenoid actuator 135 and the torque interrupting clutch 85 by arranging the solenoid actuator 135 within the carrier 81. Further, it is also possible to improve reliability by suppressing a colliding risk of the solenoid actuator 135 with an obstacle. In addition, since the solenoid actuator 135 is arranged on an outer periphery of the support part 101, the occupying space thereof can be reduced.

The solenoid actuator 135 includes a plunger 139 for interrupting and moving the clutch ring 89 and an inner periphery of the plunger 139 is directly supported on an outer periphery of the actuator fitting portion 105 of the support part 101.

Therefore, the shaft vibration between the first shaft 95 and the plunger 139 can be suppressed and thus it is possible to perform an urging operation of the clutch ring 89 by the plunger 139 in a rapid and correct manner.

Embodiment 2

Figure 9:
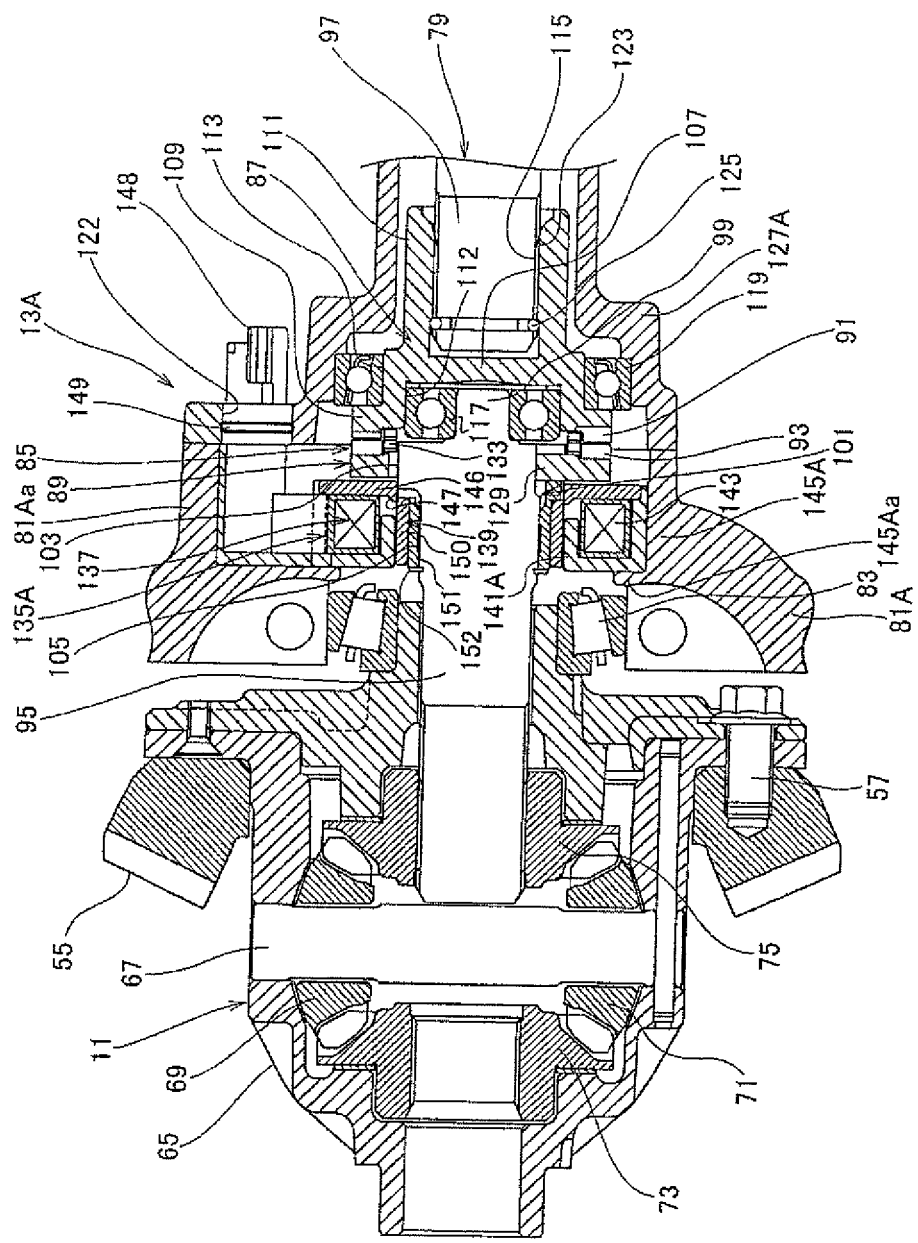
FIG. 9 is an enlarged sectional view illustrating surroundings of a front differential device. (Embodiment 2)

FIG. 9 is an enlarged sectional view illustrating surroundings of a front differential device according to the Embodiment 2. Basic configuration thereof is the same as in the Embodiment 1 and the same configuration as in the Embodiment 1 uses the same reference numeral. Corresponding parts are indicated as the same reference numeral with subscript "A" and duplicated description will be omitted.

As illustrated in FIG. 9, in the axle disconnect device 13A of the present embodiment, the yoke 141A of the solenoid actuator 135A is formed separately from the carrier 81A.

The yoke 141a is press-fitted into a fitting part 145A of the carrier 81A. The fitting part 145A is provided with a stopper part 145Aa protruding inward therefrom for axially positioning the yoke 141A.

By these arrangements, the solenoid actuator 135A is disposed around the support part 101.

In the present embodiment, a housing for supporting the cylindrical clutch body 87 is not provided and the cover 127A is directly coupled to the actuator accommodating part 81Aa. The cylindrical clutch body 87 is supported on the cover 127A.

In this way, the present embodiment also has same effect as that of the Embodiment 1.

Further, in the present embodiment, the carrier 81A may be formed by a non-magnetic aluminum alloy.

Embodiment 3

Figure 10:
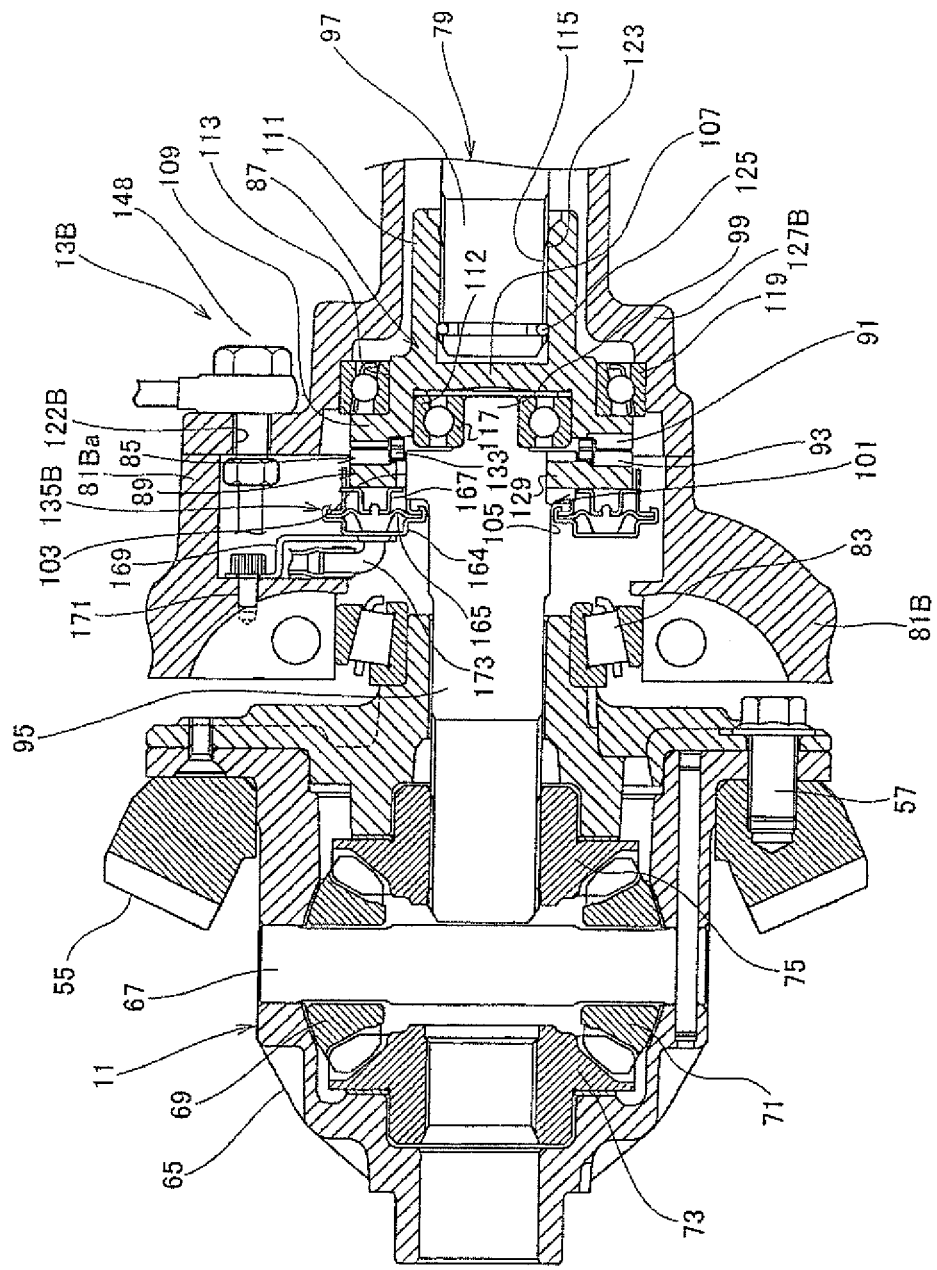
FIG. 10 is an enlarged sectional view illustrating surroundings of a front differential device. (Embodiment 3)

FIG. 10 is an enlarged sectional view illustrating surroundings of a front differential device according to an Embodiment 3. Basic configuration thereof is the same as in the Embodiment 1 and the same configuration as in the Embodiment 1 uses the same reference numeral. Corresponding parts are indicated as the same reference numeral with subscript "B" and duplicated description will be omitted.

As illustrated in FIG. 9, in the axle disconnect device 133 of the present embodiment, a diaphragm actuator 135B is employed as the actuator, instead of the solenoid actuator.

The diaphragm actuator 135B is loosely fitted into the actuator fitting portion 105 behind the clutch ring 89.

The diaphragm actuator 135B includes a diaphragm 165 as an actuating part and a contact part 167 attached to the diaphragm 165 within a diaphragm case 164.

Brackets 169 are provided on approximately two places of the diaphragm case 164 in a peripheral direction thereof. The fixing of the diaphragm case 164 is carried out by fastening the brackets 169 onto the carrier 81B side by a bolt 171.

By such a fixation, the diaphragm actuator 135B as the actuator is placed on an outer periphery of the actuator fitting portion 105 of the support part 101.

Piping 173 of the diaphragm actuator 135B extends outward through a penetrating part 122B of the cover 127B and is connected to an air source for controlling an air supply and discharge.

In the present embodiment, a housing for supporting the cylindrical clutch body 87 is not provided and the cover 127B is directly coupled to the actuator accommodating part 81Ba. The cylindrical clutch body 87 is supported on the cover 127B.

And, the diaphragm 165 is flexed to cause the contact part 167 to forcibly move the clutch ring 89 by controlling an air supply to the diaphragm actuator 135B. By such a movement of the clutch ring 89, it is possible to switch from 2WD to 4WD, as mentioned above. Further, the clutch ring 89 is returned by controlling an air discharge from the diaphragm actuator 135B and thus switching from 4WD to 2WD can be carried out.

In this way, the present embodiment also has same effect as that of the Embodiment 1.

Although a gap is formed between an inner periphery of the diaphragm case 164 and an actuator fitting portion 105 in FIG. 10, it is also possible to indirectly support the diaphragm 165 as an actuating part and the contact part 166 on an outer periphery of the support part 101 by fitting an inner periphery of the diaphragm case 164 into an outer periphery of the actuator fitting portion 105 so as to rotate relative to each other.

The shaft vibration between the first shaft 95 and the diaphragm 165 and between the first shaft 95 and the contact part 167 can be suppressed by such a support operation and therefore it is possible to perform an urging operation of the clutch ring 89 in a rapid and correct manner.

Further, in the present embodiment, the carrier 81B may be formed by a magnetic material or a non-magnetic material.

MODIFICATION

Herein, the support part 101 may formed on the cylindrical clutch body 87, the solenoid 137 of the solenoid actuators 135, 135A may be fixedly supported on the housing 121 side and the plunger 139 may be fitted into the support part of an outer periphery of the cylindrical clutch body 87. Similarly, the diaphragm actuator 135B may be fixed to the cover 127B and the diaphragm case 164 may be placed on an outer periphery of the cylindrical clutch body 87.

Although in the above embodiments the actuator 135, 135A, 135B actuates the movable body 89, a configuration in which the actuator itself moves in the axial direction so as to move the clutch device 85 in the axial direction may be adapted. In this configuration, it is preferable that the actuator includes the electromagnetic solenoid.

The clutch device 85 may be provided with a detector for detecting a connecting/disconnecting condition of the clutch device. The detector may be a position switch in which an actual position of the clutch device is detected directly or indirectly through one or more members, or the detector may be a non-contact type in which the connecting/disconnecting condition is determined based on a change of a magnetic field or an electrical potential based on a movement of the clutch device or the electromagnetic solenoid.

The power interrupting apparatus of the embodiment may be attached to a rear differential device in a rear power-train of a vehicle of a FF (front engine/front drive) base power-train system.

In accordance with the above embodiments and modifications, a power interrupting apparatus 13, 13A, 13B which is mounted in a power-train of a vehicle 1 may include: a first rotating member 95 connected to an output portion 75 of a differential device 11; a second rotating member 97 connected to one of right and left wheels 59, 63 of the vehicle 1; a clutch device 85 adapted to interrupt a coupling between the first rotating member 95 and the second rotating member 97; and an actuator 135, 135A, 135B adapted to actuate the clutch device 85. The actuator 135, 135A, 135B may be disposed on a radially outer periphery of a part of one of the first rotating member 95 and the second rotating member 97.

In the above structure, the power interrupting apparatus may further include: a support part 101 provided on said one of the first rotating member 95 and the second rotating member 97; a moveable body 89 supported on the support part 101; and an opposing part 109 opposing to the moveable body 89 and provided on the other of the first rotating member 95 and the second rotating member 97. The clutch device 85 may be provided between the moveable body 89 and the opposing part 109 and adapted to interrupt the coupling between the first rotating member 95 and the second rotating member 97 by a movement of the moveable body 89. The actuator 135, 135A, 135B may be adapted to move the moveable body 89 in an axial direction. The actuator 135, 135A, 135B may be disposed on a radially outer periphery of the support part 101.

In the above structure, the actuator 135, 135A, 135B may include an actuating part 139, 165, 167 configured to move the moveable body 89. An inner periphery side of the actuating part 139, 165, 167 may be directly or indirectly supported on the outer periphery of the support part 101.

In the above structure, the differential device 11 may be supported on a carrier 81, 81A, 81B and relatively rotatable with respect to the carrier 81, 81A, 81B. The actuator 135, 135A, 135B may be disposed in a space within the carrier 81, 81A, 81B.

In the above structure, the actuator 135, 135A, 135B may be disposed so that a bearing 83 configured to support the differential device 11 to the carrier 81, 81A, 81B is positioned between the differential device 11 and the actuator 135, 135A, 135B in the axial direction.

In the above structure, the actuator 135, 135A, 135B and the clutch device 85 are aligned in an axial direction.

In the above structure, the actuator 135, 135A, 135B and the differential device are supported on a common carrier 81, 81A, 81B.

In the above structure, the actuator may be a solenoid actuator 135, 135A or a diaphragm actuator 135B.

In the above structure, the clutch device 85 comprises a dog clutch.

Moreover, in accordance with the embodiments and modifications, a power transmitting apparatus mounted in a power-train of a vehicle 1 may include a differential device 11; and an axle disconnect device 13, 13A, 13B. The differential device 11 may include: a ring gear 55 connected to an input side of the power-train; a pinion shaft 67 that integrally rotate with the ring gear 55; a pinion gear 69, 71 supported on the pinion shaft 67; a first side gear 73 which is in mesh with the pinion gear 69, 71 and connected to one of right and left wheels 59, 63 of the vehicle 1; and a second side gear 75 which is in mesh with the pinion gear 69, 71. The axle disconnect device 13, 13A, 13B may include: a first rotating member 95 connected to the second side gear 75 of the differential device 11; a second rotating member 97 connected to the other of right and left wheels 59, 63; a clutch device 85 adapted to interrupt a coupling between the first rotating member 95 and the second rotating member 97; and an actuator 135, 135A, 135B adapted to actuate the clutch device 85. The actuator 135, 135A, 135B may be disposed on a radially outer periphery of a part of one of the first rotating member 95 and the second rotating member 97.

What is claimed is:

1. A power interrupting apparatus mounted in a power-train of a vehicle, the apparatus comprising:
   a first rotating member connected to an output portion of a differential device;
   a second rotating member connected to one of right and left wheels of the vehicle;
   a clutch device adapted to interrupt a coupling between the first rotating member and the second rotating member;

an actuator adapted to actuate the clutch device, wherein the actuator is disposed on a radially outer periphery of a part of one of the first rotating member and the second rotating member;

a support part provided on said one of the first rotating member and the second rotating member;

a moveable body supported on the support part; and an opposing part opposed to the moveable body in an axial direction and provided on the other of the first rotating member and the second rotating member, wherein the clutch device is provided between the moveable body and the opposing part and adapted to interrupt the coupling between the first rotating member and the second rotating member by a movement of the moveable body, wherein the actuator is adapted to move the moveable body in the axial direction, and wherein the actuator is disposed on a radially outer periphery of the support part.

2. The power interrupting apparatus according to claim 1, wherein the actuator includes an actuating part configured to move the moveable body, and wherein an inner periphery side of the actuating part is directly or indirectly supported on the radially outer periphery of the support part.

3. The power interrupting apparatus according to claim 1, wherein the differential device is supported on a carrier and relatively rotatable with respect to the carrier, and wherein the actuator is supported on the carrier that rotatably supports the differential device.

4. The power interrupting apparatus according to claim 3, wherein the actuator is disposed so that a bearing configured to support the differential device on the carrier is positioned between the differential device and the actuator in the axial direction.

5. The power interrupting apparatus according to claim 1, wherein the actuator and the clutch device are aligned in the axial direction.

6. The power interrupting apparatus according to claim 1, wherein the actuator and the differential device are supported on a common carrier.

7. The power interrupting apparatus according to claim 1, further comprising:

a support part provided on said one of the first rotating member and the second rotating member;

a moveable body supported on the support part; and an opposing part opposed to the moveable body and provided on the other of the first rotating member and the second rotating member, wherein the clutch device is provided between the moveable body and the opposing part and adapted to interrupt the coupling between the first rotating member and the second rotating member by a movement of the moveable body, wherein the actuator includes an actuating part configured to move the moveable body, wherein an inner periphery side of the actuating part is directly or indirectly supported on the outer periphery of the support part, wherein the differential device is supported on a carrier and relatively rotatable with respect to the carrier, wherein the actuator is supported on the carrier that rotatably support the differential device, and wherein the actuator is disposed so that a bearing configured to support the differential device on the carrier is positioned between the differential device and the actuator in the axial direction.

8. The power interrupting apparatus according to claim 7, wherein the actuator is a solenoid actuator or a diaphragm actuator.

9. The power interrupting apparatus according to claim 8, wherein the clutch device comprises a dog clutch including dog teeth opposed to each other in the axial direction.

10. A power transmitting apparatus mounted in a power-train of a vehicle, the apparatus comprising:

a differential device; and an axle disconnect device, wherein the differential device includes:

a ring gear connected to an input side of the power-train;

a pinion shaft that integrally rotates with the ring gear;

a pinion gear supported on the pinion shaft;

a first side gear which is in mesh with the pinion gear and connected to one of right and left wheels of the vehicle; and a second side gear which is in mesh with the pinion gear, wherein the axle disconnect device including:

a first rotating member connected to the second side gear of the differential device;

a second rotating member connected to the other of right and left wheels;

a clutch device adapted to interrupt a coupling between the first rotating member and the second rotating member;

an actuator adapted to actuate the clutch device, and wherein the actuator is disposed on a radially outer periphery of a part of one of the first rotating member and the second rotating member;

a support part provided on said one of the first rotating member and the second rotating member;

a moveable body supported on the support part; and an opposing part opposed to the moveable body in an axial direction and provided on the other of the first rotating member and the second rotating member, wherein the clutch device is provided between the moveable body and the opposing part and adapted to interrupt the coupling between the first rotating member and the second rotating member by a movement of the moveable body, wherein the actuator is adapted to move the moveable body in the axial direction, and wherein the actuator is disposed on a radially outer periphery of the support part.

* * * * *